July 26, 1949.  J. A. GRANT ET AL  2,477,407
REINFORCED PLASTICS OF INCREASED STRENGTH
Filed April 22, 1943
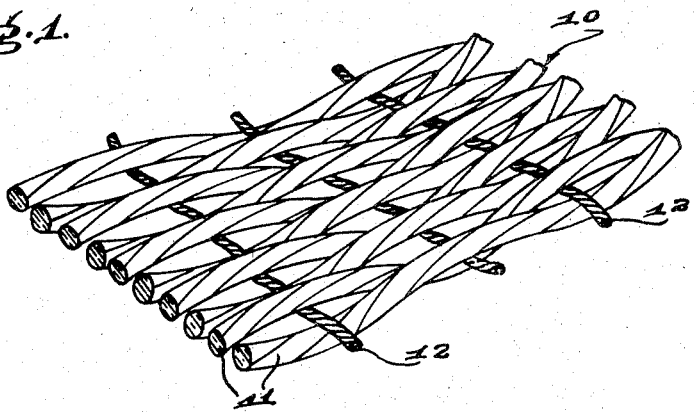
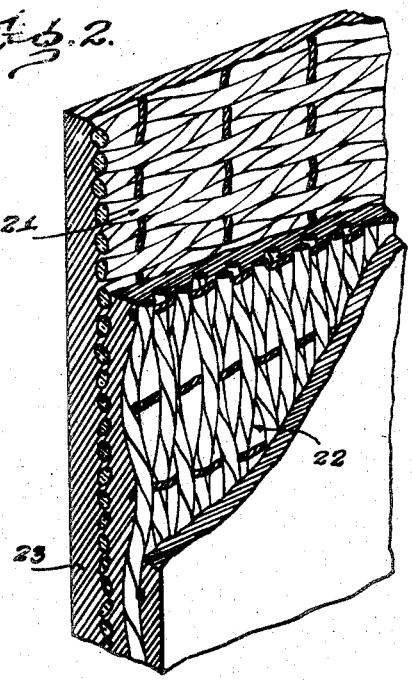
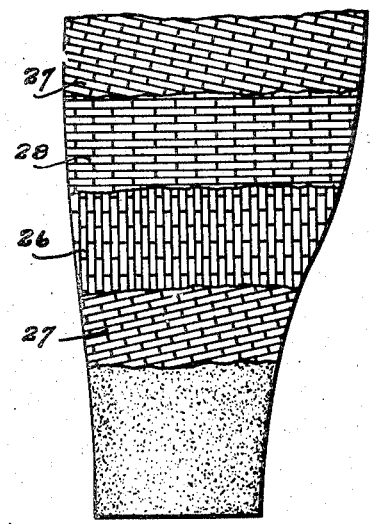
INVENTORS
J. A. Grant
BY D. E. Babcock
ATTORNEYS.

Patented July 26, 1949

2,477,407

UNITED STATES PATENT OFFICE 2,477,407

REINFORCED PLASTICS OF INCREASED STRENGTH

John A. Grant, Granville, and Donald E. Babcock, Columbus, Ohio, assignors to Owens-Corning Fiberglas Corporation, a corporation of Delaware Application April 22, 1943, Serial No. 484,116

6 Claims. (Cl. 154—140)

This invention relates to reinforced plastics or plastic laminates and especially plastics reinforced with glass fibers. It is especially applicable to synthetic resins of the phenolic and cresylic types but also has advantages and applications in the reinforcement of other synthetic resins, for instance, urea formaldehyde resins, with glass fibers.

Glass fibers as now produced are of very small diameter ranging from 2 to 10 microns. In these sizes the fibers display very great tensile strength, tests having shown that such glass fibers may have tensile strengths greater than the strongest steel piano wire. In addition, glass fibers are moisture resistant and heat resistant to a high degree so that they offer a very effective means for reinforcing synthetic resin plastics in the production of laminated parts for mechanical and electrical apparatus that require high strength and shock, temperature and moisture resistance as well as good electrical properties.

In combination with certain synthetic resin plastics, especially the phenolic and cresylic types, it has not always been possible to develop the full strength of the glass fibers. From the observed fact that laminated articles made from these plastics show a limited adhesion between adjacent laminations, it has been concluded that this faiulre is due in large part to insufficient adhesion between the glass fiber surfaces and the synthetic resin body.

Apparently this low adhesion between the plastic and the fiber surfaces may be traced to the fact that glass fiber surfaces are extremely smooth and dense and the plastic material therefore is not readily joined to the fiber surfaces. A related reason probably is that the fibers are non-hygroscopic so that any adhesion that is obtained must result from the mere contact between the surface of the glass fiber and the adjacent surface of the resin. There is no chance for the resin to enter the body of the fiber as it may do in the case of organic textile fibers.

Apparently for these reasons a plastic body reinforced with glass fibers may show failure both in flexure and tension before the strength that should be obtained from use of the glass fibers has been developed. The same reasons probably also explain the fact that these types of plastics when reinforced with glass fibers do not always provide uniform results, the strength of the finished article often being unpredictable.

It is an object of the present invention to obviate the prior difficulties encountered in reinforcing phenolic and cresylic type synthetic resins with glass fibers.

It is a further object of the invention to increase the strength of resins reinforced with glass fibers and to provide a greater uniformity in the strength of the finished products.

It is another object of the invention to provide means to increase the adhesion between the plastic and the reinforcing glass fibers and thereby permit the utilization of the full strength of the glass fibers in the reinforced article.

The invention provides for increasing the strength of plastic bodies reinforced with glass fibers by permitting the full strength of the glass fibers to be developed when the reinforced body is subjected to flexural and tensile stresses. We have discovered that this may be accomplished by increasing the adhesion between the plastic body and the glass fiber surfaces so that failure of the reinforced body under stress is less commonly due to separation between the glass fibers and the plastic material.

To obtain increased adhesion between the fibers and the plastic body we condition the fiber surfaces to cause the plastic material to more tightly adhere to the fiber surfaces. This may be most efficiently done by employing a bonding material between the fiber surfaces and the plastic material that displays good adhesion to the plastic and also to the resin. Another means of accomplishing the desired result and that may be used alone or in combination with the bonding material is to roughen the fiber surfaces to permit the plastic to more tightly adhere to the fibers.

Another procedure falling within the broad outline of the present invention and which is effective alone or in combination with either or both of the above mentioned treatments is to dehydrate the glass fiber surfaces. Apparently when dehydrated, the glass displays a greater affinity for cresylic and phenolic types of resins and thus results in a better adhesion between the plastic and the fiber surfaces.

The invention is applicable to the combination of glass fibers in any arrangement as reinforcement for plastic materials. The fibers may be in a loose mass and combined with plastic material much in the nature of a filler, or they may be in the forms of rovings, slivers, strands, webs or mats and combined with the plastic material in any suitable manner. Very favorable results are obtained by using glass fiber yarns interwoven into a particular fabric construction and the invention will be described in connection with such fabric construction.

In the drawings:

Figure 1 is a fragmentary perspective view of a fabric woven from glass fiber yarns suitable for use as a reinforcement for plastics;

Figure 2 is a perspective view illustrating the arrangement of the reinforcing fabric and a reinforced plastic body; and Figure 3 is a cross-sectional view of a propeller blade made of plastic reinforced with a fabric of interwoven glass fiber yarns, exemplifying one use to which products made in accordance with the present invention may be put.

The fabric 10 illustrated in Figure 1 is made by interweaving yarns 11 of glass fibers with filling yarns 12 of smaller diameter. The yarns 12 are preferably more widely spaced apart than the warp yarns 11. The filling yarns may be of any desired material, for instance, glass fibers, but it has been our experience that glass fiber yarns are not the most desirable as fill where the fabric is subjected to pressure during the curing and molding operation because there is apparently a tendency for the fibers of the yarns to cut each other at the intersections of the yarns when pressure is applied. For this reason we prefer to form the crossing yarns of organic fibrous material such as cotton.

In place of cotton it has been found possible to use filling yarns of a thermoplastic resinous material that is compatible with the plastic to be reinforced and that will soften at the molding and curing temperature of the plastic to be reinforced. For instance, yarns made from fibers of nylon, rayon, vinyl acetate and similar thermoplastic materials have been found highly suitable for the fill.

The relatively wide spacing of the filling yarns prevents acute bends in the glass fiber yarns so that the glass fiber warp yarns are arranged in a line that closely approximates a straight line. In this relation the warp yarns are in the best position to bear tensile stresses and there is very little or no tendency for the yarns to straighten out and thus be extended upon the application of tensile stresses to the reinforced plastic body as would be the case if an ordinary closely woven cloth were used.

A fabric constructed as shown in Figure 1 has little tensile strength in the direction generally transverse to the direction of the glass fiber yarns. This is compensated for in the plastic laminate or reinforced plastic body by employing a plurality of reinforcing fabrics and arranging the fabrics so that the glass fiber yarns extend in different directions in different fabrics throughout the reinforced body. Thus, where it is desired to have equal resistance to tensile stresses in two directions normal to each other, the fabrics are arranged so that the glass fiber yarns cross at an angle of substantially 90 degrees. This is represented in Figure 2 where two reinforcing fabrics are shown at 21 and 22 arranged to have the glass fiber yarns cross at 90 degrees. The plastic body is represented at 23. Other similar arrangements of the reinforcing fabrics may be employed to obtain the desired resistance to tensile stresses in any number of directions by arranging one or more of the reinforcing fabrics with its glass fiber yarns to extend in the directions in which stresses are to be encountered.

For example, in making an article such as an aircraft propeller blade as illustrated in Figure 3, a reinforcing fabric 26 is rolled up in the direction of the filling yarns so that the glass fiber warp yarns extend lengthwise of the blade, in which direction the greatest tensile stresses are encountered. Other reinforcing fabrics may be applied about the outside of the roll as shown as 27 and 28 arranged so that their glass fiber yarns extend in directions transverse to the yarns in the roll to resist other stresses such as torsional stresses encountered by the blade. Before or after the rolled fabric and other fabrics are arranged in the proper manner, they are impregnated with the desired resin and the combined fabrics and resin are then molded under pressure and cured.

Where a plurality of superposed fabrics are employed to reinforce the plastic body, it has been found desirable in some instances to interleave the reinforcing fabrics with cotton gauze. Apparently the gauze prevents an undue amount of the resin from being squeezed out from between superposed glass fabrics and assures that there is sufficient resin present between adjacent glass fabrics to bond the fabrics together and thus prevent delamination of the reinforced plastic when it is subjected to flexural stresses.

In accordance with the present invention, a glass fabric is treated prior to its incorporation in the plastic body to increase adhesion between the plastic material and the glass fiber surfaces. One method found very successful consists in applying to the fibers of the glass fabric a material that has high adhesion to glass and that also displays high adhesion to the plastic. Some of the materials found suitable are gelatin and other protein materials such as blood albumin and casein, amine water-soluble resins such as that available under the trade-name "Amberlite," and ethyl vinyl silicate.

Particularly good results are obtained from the use of gelatin. In applying the gelatin the fabric is soaked for a short time, say fifteen minutes or so, in a 1 to 5% solution of gelatin and warm water. The fabric is then removed, the excess solution is drained from the fabric and the fabric is dried at a little over 100° C., for instance, 120° C. The fibers throughout the fabric are covered with a film of gelatin and when this fabric is incorporated in a plastic body in the ordinary manner, the gelatin films provide an effective bond between the resin body and the reinforcing glass fibers.

It has been found that the adhesion resulting from the use of gelatin may be increased if a small amount of formaldehyde is added to the gelatin solution. Preferably the formaldehyde should be present in amounts of about 2% on the basis of a 5% gelatin solution. As a source of formaldehyde a 37% Formalin solution or hexamethylene tetramine or other formaldehyde-containing materials may be used. Usually, however, a concentrated Formalin solution is most desirable.

The treatment of the fabric with blood albumin or casein is carried out in substantially the same manner as the treatment with gelatin and in these instances, too, the adhesion shows marked improvement if formaldehyde is added to the blood albumin or casein solution in small percentages. The solutions of blood albumin and casein should be of substantially the same degree of concentration as in the case of gelatin, and substantially the same percentages of formaldehyde may be employed. In the cases where gelatin, casein and albumin are employed, formaldehyde may be added as an after treatment by dipping a fabric coated with one of these materials and dried or partially dried into a formaldehyde-containing solution and then drying the fabric.

The same application procedure is followed in the use of Amberlite and ethyl vinyl silicate as in the case of gelatin and gelatin and formaldehyde, except that the solutions are usually more dilute, containing 1 to 2% or so of the resinous material, and the fabric after being thoroughly wetted with the solution is preferably air dried instead of being dried under heat.

With the use of any of these materials an extremely thin coating of the treating material is deposited over each fiber surface. Apparently this not only greatly increases the adhesion between the plastic material to be reinforced and the glass fibers but also aids in obtaining flow of the plastic into the spaces between adjacent fibers in the yarns of the fabric to thoroughly impregnate the fabric.

Of the materials mentioned, gelatin and gelatin and formaldehyde provide the best results, tests having shown that tensile strength of plastics reinforced with glass fabrics treated with these materials have from two to four and more times the strength of plastics reinforced with glass fabrics not so treated. The flexural strength shows a similar increase.

Another procedure that is effective in increasing the strength of plastics reinforced with glass fibers consists in dehydrating the surfaces of the glass fibers and thereby apparently also increasing the adhesion between the surfaces and the reinforced plastic. Dehydration may be accomplished by treating the glass fabric with aluminum chloride or ferric chloride in solution, anhydrous hydrochloric acid gas, ammonium chloride in liquid ammonia, silicon tetrachloride, and similar materials.

The dehydration with aluminum or ferric chloride is best accomplished by soaking the glass fabric for about one to two hours in a solution of the selected chloride in ether, benzene or toluene contained in an air tight vessel. The fabric should be impregnated with the plastic material immediately upon removal from the solution and drying of the fabric. Normally the solution is of a concentration corresponding to one gram of anhydrous chloride to each 50 ml. of solvent.

Anhydrous hydrochloric acid gas is employed by immersing the fabric in dry toluene saturated with dry hydrochloric acid gas for one to two hours in an air tight vessel or by treating the fabric with dry hydrochloric acid gas in a closed container in such a manner that the gas comes into contact with all parts of the fabric.

If ammonium chloride is to be used, it should be in the form of a cold dispersion of the chloride in liquid ammonia in a container similar to a Dewar flask or in a closed vessel under pressure so that the ammonia may be maintained in a liquid state. The fabric is soaked for a short time in the dispersion.

To dehydrate the glass fiber surfaces with silicon tetrachloride the fabric is soaked about 1½ hours in a mixture of three parts anhydrous toluene and one part silicon tetrachloride. In the case of the three last mentioned treatments, the fabric should be impregnated with the plastic material immediately upon completion of the dehydrating treatment as in the case of treatment with ammonium and ferric chlorides.

Adhesion between the glass fiber surfaces and the plastic material may also be increased by roughening the fiber surfaces. Roughening may be accomplished by treating the fabric with a material capable of dissolving away constituents of the glass such, for example, as hydrofluoric acid, alkali fluo silicates, and sodium silicate. The fabric is immersed in a water solution of the glass attacking agent for a length of time depending upon the activity of the agent. For instance, in the case of hydrofluoric acid the fabric is dipped two to four times quickly in succession in a water solution of .5 to 5% hydrofluoric acid and then rinsed in warm water and dried. In the case of the other attacking agents mentioned, the fabric is usually soaked for five or ten minutes in a ½ to 1½% water solution.

The various treatments mentioned, namely application of a surface coating, dehydration of the glass fiber surfaces, and roughening of the glass fiber surfaces, are individually effective in increasing the adhesion between the surfaces and the plastic material. The adhesion may be still further increased in certain instances, however, by combining two or all of the treatments so that the fiber surfaces are both roughened and provided with a surface coating such as gelatin, or so that the fiber surfaces are roughened, dehydrated, and then provided with a surface coating of gelatin or the like.

Various modifications may be made within the spirit and scope of the appended claims.

We claim:

1. The process of preparing a plastic laminate reinforced with a fibrous body containing glass fibers which comprises coating the surfaces of the glass fibers with an aqueous solution of the reaction product of formaldehyde with a protein selected from the group consisting of gelatin, blood albumin and casein, subjecting the composite mass to elevated temperatures to produce a hard, dry film on the surface of the glass fibers, impregnating the coated fibers with a heat reactive resin selected from the group consisting of phenol and urea formaldehyde resins, and reacting the resin to its cured stage.

2. The process of preparing a plastic laminate reinforced with glass fibers which comprises coating a mass of fibers with an aqueous solution containing 1 to 5 percent gelatin and 0.4 to 2.0 percent formaldehyde, causing the solution while on the surface of the fibers to form a hard dry film, impregnating the coated fibers with a resin selected from the group consisting of the phenol and urea formaldehyde, and subjecting the mass to heat and pressure.

3. The process of preparing plastic laminates which comprises coating a fabric having glass fibers therein with a dilute aqueous solution of gelatin and formaldehyde in which the ratio of gelatin to formaldehyde is of the order of 5 to 2, heating the coated fabric to temperatures below 120° F., additionally coating the fabric with a resinous solution of phenol formaldehyde, superposing such fabric upon a similarly treated fabric to form a laminate, and curing the laminate.

4. A product of manufacture comprising as a continuous phase a body of resin which is the reaction product of an aldehyde with a member of the group of materials consisting of phenol and urea, and glass fibers arranged in said body to reinforce the resin, the surfaces of the glass fibers being provided with a coating of the reaction product of formaldehyde with a protein selected from the group consisting of gelatin, blood albumin, and casein.

5. A product of manufacture comprising a plurality of superposed fabrics containing glass fibers, a synthetic resin selected from the group consisting of phenolic and urea formaldehyde impregnating said fabrics and bonding them together into an integral mass, said resin forming a continuous phase, and a surface coating of the reaction product of gelatin and formaldehyde interposed between said resin and the surfaces of the glass fibers throughout said mass.

6. As an article of manufacture, a void-free composite body of phenol formaldehyde resin having glass fibers therein as reinforcement, the resin being bonded to the fibers by means of a layer on the fibers of the reaction product of gelatin and formaldehyde.

JOHN A. GRANT.
DONALD E. BABCOCK.

REFERENCES CITED

The following references are of record in the file of this patent:

UNITED STATES PATENTS

| Number | Name | Date |
|---|---|---|
| 2,132,702 | Simpson | Oct. 11, 1938 |
| 2,133,238 | Slayter | Oct. 11, 1938 |
| 2,146,870 | Whiteley | Feb. 14, 1939 |
| 2,184,320 | Simpson | Dec. 20, 1939 |
| 2,195,272 | Ehlers | Mar. 26, 1940 |
| 2,204,859 | Hyatt | June 18, 1940 |
| 2,209,850 | Shand | July 30, 1940 |
| 2,215,061 | Alt | Sept. 17, 1940 |
| 2,245,783 | Hyde | June 17, 1941 |
| 2,315,259 | Hyde | Mar. 30, 1943 |
| 2,354,110 | Ford | July 18, 1944 |